(12) United States Patent
Conti (10) Patent No.: US 8,608,377 B2
(45) Date of Patent: Dec. 17, 2013

(54) THERMOCOUPLE EXTENSION WIRE (75) Inventor: Richard F. Conti, New Hope, PA (US)

(73) Assignee: Heraeus Electro-Nite International N.V., Houthalen (BE)

( * ) Notice: Subject to any disclaimer, the term of this patent is extended or adjusted under 35 U.S.C. 154(b) by 1130 days.

(21) Appl. No.: 12/256,577

(22) Filed: Oct. 23, 2008

(65) Prior Publication Data

US 2009/0107537 A1 Apr. 30, 2009

Related U.S. Application Data (60) Provisional application No. 60/982,292, filed on Oct. 24, 2007.

(51) Int. Cl.
*G01K 7/00* (2006.01)

(52) U.S. Cl.
USPC ........................ 374/179; 136/236.1

(58) Field of Classification Search
USPC ........................ 374/179; 136/236.1
See application file for complete search history.

(56) References Cited

U.S. PATENT DOCUMENTS

| | | | | |
|---|---|---|---|---|
| 1,561,593 | A * | 11/1925 | Brown | ........................ 136/241 |
| 2,993,944 | A | 7/1961 | Silver | |
| 2,999,121 | A | 9/1961 | Mead | |
| 3,017,269 | A | 1/1962 | Finch | |
| 3,298,874 | A | 1/1967 | Davies | |
| 3,372,062 | A * | 3/1968 | Zysk | ........................ 136/227 |
| 3,684,584 | A * | 8/1972 | Wang | ........................ 136/241 |
| 3,926,681 | A | 12/1975 | Wang | |
| 4,002,500 | A | 1/1977 | Wang | |
| 4,229,230 | A | 10/1980 | Hance | |
| 4,588,308 | A | 5/1986 | Saito | |
| 4,990,193 | A * | 2/1991 | Kimura | ........................ 136/201 |

(Continued)

FOREIGN PATENT DOCUMENTS

| | | |
|---|---|---|
| CN | 201335745 Y | 10/2009 |
| GB | 719026 | 11/1954 |
| JP | 08-338769 A | 12/1996 |
| JP | 2004163109 A | 6/2004 |

OTHER PUBLICATIONS

International Search Report and Written Opinion for the related International Application No. PCT/IB2008/002816; dated Apr. 23, 2009.

(Continued)

*Primary Examiner* — Mirellys Jagan
(74) *Attorney, Agent, or Firm* — Panitch Schwarze Belisario & Nadel LLP (57) ABSTRACT

A thermocouple system is disclosed. The thermocouple system includes a thermocouple having a positive lead and a negative lead. A positive wire is connected at a first end to the positive lead at a first junction and at a second end to a second junction. A negative wire is connected at a first end to the negative lead at a third junction and at second end to a fourth junction. The second and fourth junctions constitute a reference junction. At least one of a thermal conductivity and a gauge of at least one of the positive wire and the negative wire are selected to govern the respective flows of heat from the first junction toward the reference junction and the flow of heat from the third junction toward the reference junction to be of such quantities that the difference in the heat flows is less than a predetermined amount.

9 Claims, 4 Drawing Sheets

(56) References Cited

U.S. PATENT DOCUMENTS

| | | | |
|---|---|---|---|
| 5,437,745 | A | 8/1995 | Frank et al. |
| 7,175,343 | B2 | 2/2007 | Phillips |
| 2006/0227849 | A1* | 10/2006 | Phillips ................... 374/179 |
| 2008/0175304 | A1* | 7/2008 | Adelsberg et al. ............ 374/179 |

OTHER PUBLICATIONS

Knyazev O A; "Universal Extension Leads for High-temperature Thermocouples" Measurement Techniques, Consultants Bureau; New York, US; vol. 22, No. 2, Mar. 1, 1979; pp. 279-280.

Stentz P et al.; "Leitungsabgleich in Temperaturmesskreisen"; Elektrotechnische Zeitschrift, Ausgabe B, Vde Verlag GmbH, Berlin, DE, vol. 27, No. 18; Jan. 1, 1975; pp. 495-496.

Office Action issued May 25, 2012 in KR Application No. 10-2010-7000027(with English translation).

Decision of Grant issued Feb. 3, 2012 in RU Application No. 2010120654 (with English translation).

Office Action issued Mar. 6, 2012 in JP Application No. 2010-530578 (with English translation).

Ho et al, "Thermal Conductivity of Ten Selected Binary Alloy Systems," Journal of Physical and Chemical Reference Data, vol. 7, No. 3, pp. 1045-1052 (1978).

Relevant Excerpt of ASM Speciality Handbook, "Copper and Copper Alloys," ASM International, pp. 4-5, (Aug. 2001).

Hart, "Deoxidation control for molten copper," BHP Technical Bulletin, vol. 21, No. 2, pp. 27-30 (Nov. 1977).

Relevant Excerpt of "Manual on the Use of Thermocouples in Temperature Measurement," ASM STP 470B, pp. 27-29, 40, 46-48, 202-204 and 211-213.

* cited by examiner

THERMOCOUPLE EXTENSION WIRE

CROSS-REFERENCE TO RELATED APPLICATION

This application is entitled to and claims the benefit of the priority pursuant to 35 U.S.C. §119(e) of U.S. Provisional Patent Application No. 60/982,292, filed Oct. 24, 2007, the disclosure of which is hereby incorporated herein by reference.

BACKGROUND OF THE INVENTION

Thermocouples used for high temperature measurements are generally made of noble metals such as platinum and alloys of platinum. Most common are: (1) Type R thermocouples having a positive lead material of platinum and 13% rhodium and a negative lead of platinum, and (2) Type S thermocouples having a positive lead material of platinum and 10% rhodium and a negative lead of platinum.

A disadvantage of noble metal thermocouples is their high cost, the cost being proportional to the length of the platinum and platinum/rhodium thermocouple wires.

Inn an industrial environment, the instrumentation at which the reference junction is located is typically distant from the thermocouple. In particular, where the temperature of molten metals is being measured, the instrumentation used to measure the emf output of the thermocouple is typically at a great distance, e.g. 100 feet, from the measurement junction of the thermocouple. To extend the noble metal thermocouple 100 feet or more to the measurement junction would be prohibitively expensive. Further, where for instance, the thermocouple is used for only one or a few measurements, such as is typically the case in the temperature measurement of molten metals, the use of a noble metal thermocouple which would extend for 100 feet or more becomes even more prohibitive.

Temperature measurement systems which use a noble metal thermocouple for measuring the temperature of molten metals generally minimize the length of the noble metal thermocouple wires by attaching, in a connecting device frequently referred to as a sensor or probe, connecting wire made of less expensive metals/metal alloys, to connect the thermocouple to the distant measuring instrument. Such connecting wire is commonly referred to as extension wire.

Extension wire may be used to connect a thermocouple to a distant measuring instrument, while retaining acceptable measurement accuracy for most applications by: (1) selecting the thermoelectric properties of the extension wire to be substantially the same as those of the noble metal thermocouple to which it is attached over the temperature range at which the extension wire operates, and (2) maintaining the junction of the positive thermocouple wire and the positive extension wire to be at the same temperature as the junction of the negative thermocouple wire and the negative extension wire. Under these conditions, the voltage measured at the reference junction is ideally a function of only the temperature difference between the measurement junction and the reference junction irrespective of the temperature of junctions formed at the connection of the thermocouple wires and the extension wires. Conventionally, the extension wire for connecting to the positive thermocouple lead of a noble metal thermocouple is made of pure copper, and the extension wire connecting to the negative lead is made of a copper-nickel alloy. The selection of a particular type of material for matching the thermoelectric properties of one type of extension wire with that of a noble metal thermocouple for minimizing errors due to the mismatch of the thermoelectric properties between the thermocouple and the extension wires is described in U.S. Pat. Nos. 3,926,681 and 4,002,500. The measurement error due to a difference in the temperatures at the junctions of a thermocouple and the extension wires due to mismatching of the thermoelectric properties of the extension wire to the thermocouple element is discussed in the "*Manual on the Use of Thermocouples in Temperature Measurement*", ASTM Pub. 470B, 1981, pages 27-35.

As discussed above, a temperature difference arising between the positive and negative junctions of the thermocouple and the extension wire (hereafter referred to as intermediate junctions) results in an error of the measurement of the thermocouple emf. Not discussed in the prior art is that this temperature difference between the intermediate junctions may arise from a difference in the heat flowing from the positive intermediate junction to the cooler corresponding reference junction and the heat flowing from the negative intermediate junction to the cooler corresponding reference junction. The difference in heat flows results in an apparent cooling of one of the junctions under conditions where both junctions are receiving an equal heat input. This temperature difference will increase in proportion to the time that the thermocouple, more specifically the intermediate junctions, are exposed to a circumstance of progressive heat gain as a result of exposure to the high temperature environment.

Increasing the accuracy of noble metal temperature measurements, and in particular, increasing the accuracy of the temperature measurement of molten metals would be an economic advantage to industry. Consequently, reducing the differential heat flow from the junctions of the thermocouple and the extension wires through the thermocouple extension wires would be desirable.

SUMMARY OF THE INVENTION

A thermocouple system is disclosed. The thermocouple system includes a thermocouple having a positive lead and a negative lead. A positive wire is connected at a first end to the positive lead at a first junction and at a second end to a second junction. A negative wire is connected at a first end to the negative lead at a third junction and at second end to a fourth junction. The second and fourth junctions constitute a reference junction. At least one of a thermal conductivity and a gauge of at least one of the positive wire and the negative wire are selected to govern the respective flows of heat from the first junction toward the reference junction and the flow of heat from the third junction toward the reference junction to be of such quantities that the difference in the heat flows is less than a predetermined amount.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
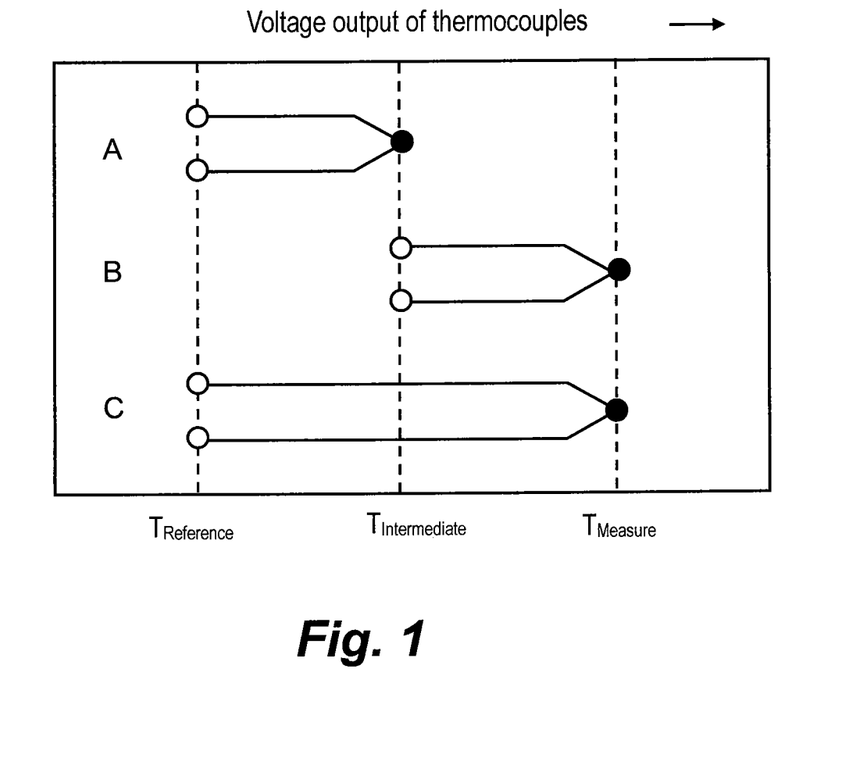
FIG. 1 is a schematic diagram of thermocouples A, B and C.

Referring now to FIG. 1, there is shown two thermocouples, both being identical in thermoelectric properties. The combination of the first thermocouple A with its reference junction at $T_{Reference}=32°$ F. and its measurement junction at some intermediate temperature $I_{Intermediate}$, and the second thermocouple, B, with its reference junction at the intermediate temperature, $I_{Intermediate}$ and its measuring junction at the temperature to be measured, $T_{Measure}$, is equivalent to a single thermocouple with its reference junction at 32° F. and its measuring junction at the temperature to be measured $T_{Measure}$, i.e. $emf_A + emf_B = emf_C$, where emf is the electromotive force produced by the thermocouple(s). Simply stated, if the emf verses temperature relationship of a thermocouple is known for one reference temperature then the emf generated at any other reference temperature is predictable.

A practical consequence is that an extension wire pair A, having the same thermoelectric characteristics as those of the thermocouple pair B, but being of different materials, can be inserted into the thermocouple circuit, (for example between $T_{Reference}$ and $I_{ntermediate}$), without affecting the net emf that would have been measured by an unbroken thermocouple C.

In many industrial applications using extension wires connecting to a thermocouple in a housing, where the temperature at the measurement junction may exceed 2500° F., the intermediate junctions, being situated in the housing results in the temperature of the intermediate junction not exceeding 400° F. Similarly, by practice the reference junction at the measuring instrumentation does not fall below 32° F. Consequently, because the temperature range over which extension wires operate is limited, extension wires, made of materials that are less expensive than noble metal thermocouples, are often used in industrial applications to extend the thermocouple to the reference junctions. Ideally, to avoid inaccuracy, the extension wires and a noble thermocouple should have matched thermoelectric characteristics such that the differential electromotive force, emf, developed between the two extension wires should be substantially equal, both in polarity and magnitude to the differential emf developed between the two noble metal thermocouple wires, at any temperature within the range of 32° F. to 400° F.

Figure 2:
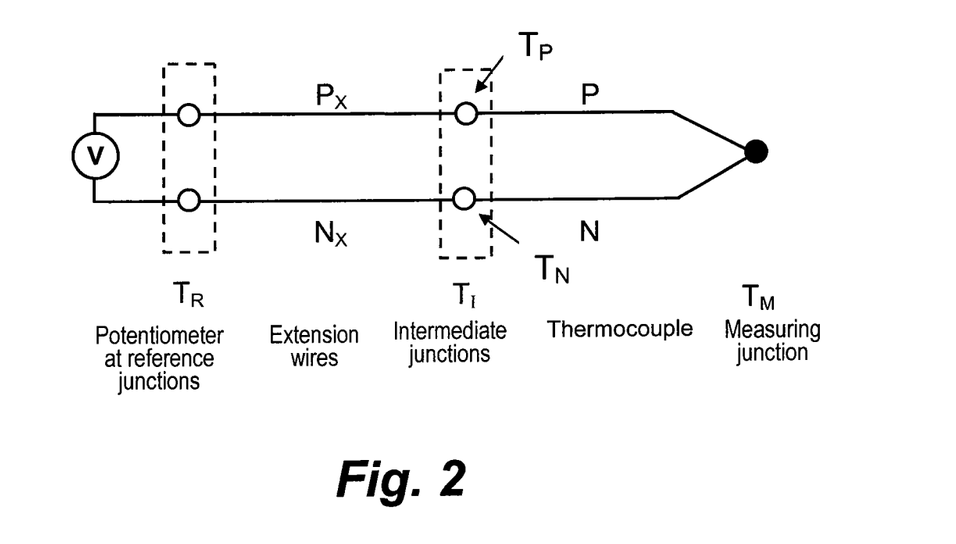
FIG. 2 is a schematic diagram of a thermocouple circuit.

FIG. 2 shows the use of extension wires ($P_X$, $N_X$) in a thermocouple circuit of Type S and Type R, where the noble metal thermocouple P, N is connected to intermediate junctions at point $T_I$, and extension wires $P_X$, $N_X$ are inserted between the intermediate junctions and the reference junctions located at point $T_R$. The output of such a thermocouple assembly can be calculated by summing the voltages of all the junctions between the temperatures at each extremity, such as;

$$(E_{thermocouple\ assembly})_{T_R}^{TM} = (E_{PX})_{T_R}^{TI} + (E_P)_{T_I}^{TM} + (E_N)_{T_M}^{TI} + (E_{NX})_{T_I}^{TR}$$

Where: $E_{PX}$ equals the emf between point TI and TR;
$E_P$ equals the emf between points TM and TI
$E_N$ equals the emf between point TI and TM; and
$E_{NX}$ equals the emf between points TR and TI It has been found that there are sources of error in thermocouple temperature measurement other than errors introduced by extension wire not having a matching thermoelectric properties (emf). The benefit of reducing these errors may far out way the benefits of matching the emf characteristics of the extension wires and the thermocouple. One of these errors, and the subject of this invention, arises when a temperature difference exists between the junctions at which each thermocouple wire is connected to its respective extension wire, even if the extension wire pair matches exactly the thermocouple emf at each temperature.

Referring to FIG. 2, let:

$$T_{(PX\ to\ P)} \neq T_{(NX\ to\ N)}$$

Figure 3:
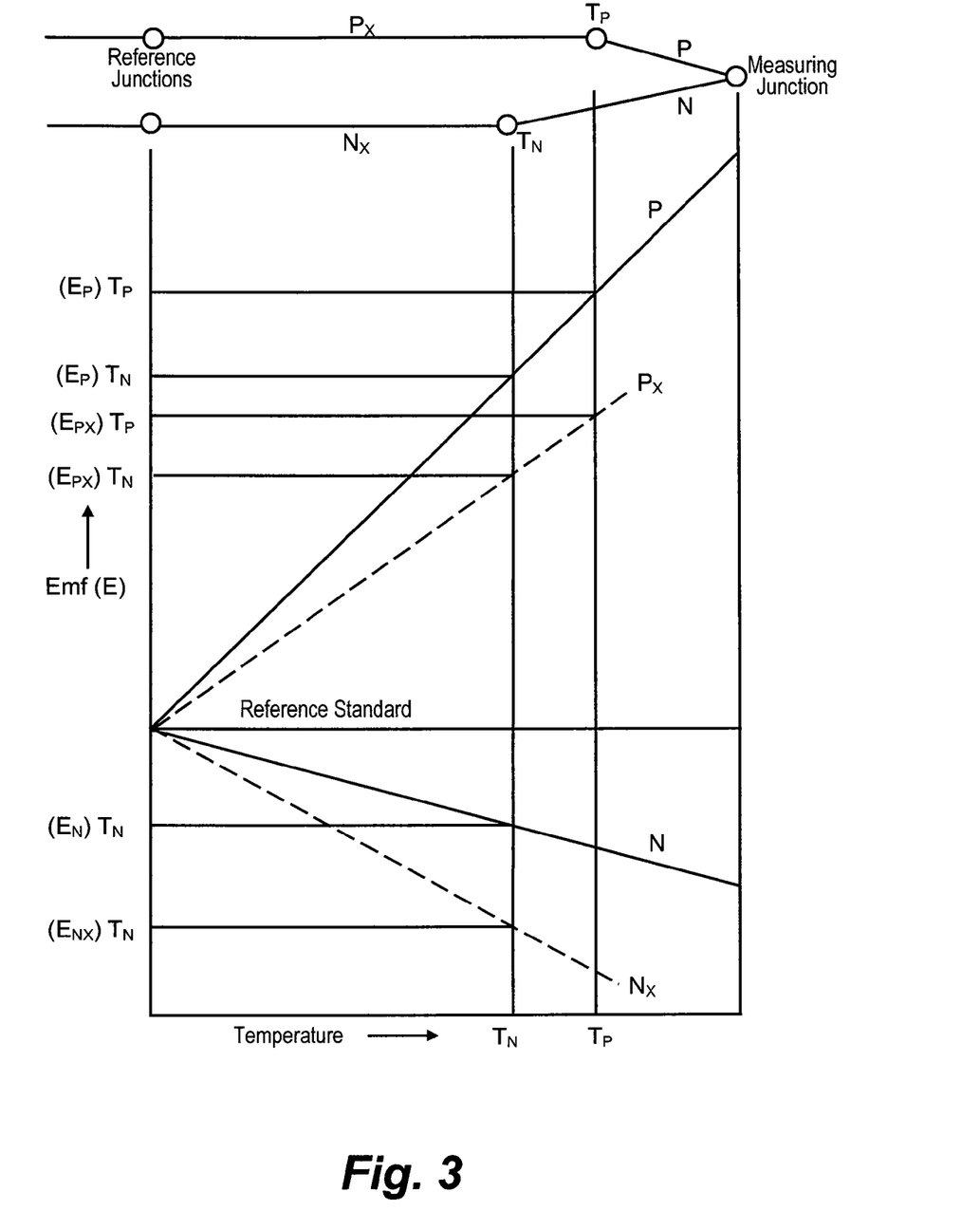
FIG. 3 is an emf versus temperature plot of a thermocouple circuit.

FIG. 3 is a plot of emf verses temperature for positive (P), and negative (N) thermocouple wires P and N and corresponding extension wires PX and NX.[1] The following relationships apply at any temperature T within the operating range of the extension wires: L6 [1] See "*Manual on the Use of Thermocouples in Temperature Measurement*", ASTM Pub. 470B, 1981, page 34.

The thermocouple output=the extension pair output;

$$E_P - E_N = E_{PX} - E_{NX}$$

Rearranging;

$$E_P - E_{PX} = E_N - E_{NX}$$

If a temperature difference exits between the two junctions where P joins PX at $T_P$ and N joins NX at $T_N$, that is $T_P \neq T_N$, an unwanted emf will exist across the two junctions of a magnitude;

$$\Delta E = (E_P - E_{PX})_{T_R} - (E_N - E_{NX})_{T_N}$$

$$\Delta E = (E_P - E_{PX})_{T_P} - (E_P - E_{PX})_{T_N}$$

The sign of $\Delta E$ when $T_P \neq T_N$, whether the error results in a positive or negative deviation will depend on the magnitude of $T_P \neq T_N$ and the emf relationship of PX and NX to P and N.

There are several reasons for errors resulting from the condition where $T_P \neq T_N$ which are inherent in commercial thermocouple assemblies. An increased likelihood of error has been observed, where $T_P \neq T_N$, in thermocouple assemblies having disproportionately long extension wires compared to the length of the thermocouple noble wires. This condition is very common in platinum based noble metal thermocouple systems where the length of the noble thermocouples is kept as short as possible due to the cost of the platinum based metals in comparison to the cost of the extension wires.

A further increase in errors has been observed in thermocouple assemblies where $T_P \neq T_N$ where there is a disparity in diameter of the extension wire verses the noble metal thermocouple wire. This is acutely evident in disposable thermocouple devices of the type described in, for example, Patent Nos. GB 719026, U.S. Pat. Nos. 2,993,944, 2,999,121, and 3,298,874.

A further increase in errors has been observed in thermocouple assemblies where $T_P \neq T_N$ where there is a disparity of physical wire diameter between conductors of the extension wire materials which are intermediate in the temperature circuits providing means for instant connection and disconnection of parts of the thermocouple circuit. U.S. Pat. No. 4,229,230 discloses an example of such asymmetry in a connecting member.

Another source of error in temperature measurement in regard to using extension wires in thermocouple circuits, besides the aforementioned emf effects, is that due to a difference in the heat flow in the PX and NX extension wires from the higher temperature intermediate junctions to the lower temperature reference junctions. The difference in heat flow induces a difference in temperature between the positive and negative intermediate junctions in those cases where the thermal conductivity between the positive and negative junctions is not infinite. A brief overview of the laws of steady state one-dimensional heat conduction will help to explain the difficulties overcome by this invention.

When there exists a temperature gradient within a body, such as an extension wire, heat energy will flow from the region of high temperature to the region of low temperature. This phenomenon is known as conduction heat transfer, and is described by Fourier's Law. For one dimensional heat flow:

$$q = -k\frac{dT}{dx}$$

where the heat flux q (watts/meter$^2$) depends on a given temperature profile T and thermal conductivity coefficient k (watts/meter-Kelvin) is the heat transfer rate per unit area perpendicular to the direction of transfer. The minus sign is a convention indicating that heat flows down the temperature gradient.

If the heat flow, measured in watts, is through a defined cross-sectional area A, the equation becomes:

$$q = -kA\frac{dT}{dx}$$

Integrating the heat flow equation through a material's thickness Δx gives, $$q = \frac{kA}{\Delta x}(T_1 - T_2),$$

where $T_1$ and $T_2$ are the temperatures at the two boundaries of the body.

With this understanding of heat conduction one can then look at how the difference in thermal conductivity of the extension wires can result in real temperature errors.

For example, a majority of noble metal thermocouple systems utilize a copper and copper-nickel extension wire pair to connect, at the intermediate junctions, the noble metal thermocouple having a measurement junction to the measuring instrument having reference junctions. The structure at the intermediate junctions and the reference junctions are each designed to maintain the positive and negative junctions at substantially the same temperature. However, because the positive intermediate junction and the negative intermediate junction must be electrically isolated, the thermal conductivity between the junctions is finite and thus, the positive and negative junctions may not be maintained at the exact same temperature.

The thermal conductivity coefficient k, at 68° F. of the copper wire specified for the extension wire by National and International standards organizations for extension of the positive thermocouple of a noble metal thermocouple is about 390 W/m-K; and that of the copper-nickel extension wire for extension of the negative lead is about 85 W/m-K. If the heat input to the hotter end of each of the two extension wire legs is maintained at the same value and the wire cross-sectional area of each wire is identical, the hotter end of the wire with the higher thermal conductivity will over time be at a lower temperature than the wire with the lower conductivity due to greater conductive heat loss down to the colder end (reference junction) of the wire. Correspondingly, the colder end of the higher conductivity extension wire will be at a slightly higher temperature than the lower conductivity extension wire due to greater heat flow toward that end. This effect is compounded by the thermal and electrical insulation commonly placed around and separating each wire from ambient environmental heat exchanges and promoting electrical isolation. With continued heat input at the hotter end of the wires the temperature gradient along the extension wire between the hot and cold ends of the each separate wire will become increasingly dissimilar, resulting in larger errors in temperature measurement as explained using FIG. 3.

The heat flow in the extension wires is a function of the thermal conductivity coefficient and the gauge of the wire. Thus, the heat flow in the respective extension wires can be governed by selecting specific values for the gauge of the wires, the thermal conductivity coefficient of the wires or both. In practice, in the case of noble metal thermocouple systems, merely reducing the gauge of the copper extension wire and increasing the diameter of the copper-nickel extension wire conventionally used with the noble metal thermocouples sufficiently to equalize the heat flow in the extension wire paths has been found to be impractical because of the thinner copper wire being subject to breakage, and/or a copper-nickel alloy wire of larger gauge being of unacceptably high cost. Consequently, it is desirable to select alternate materials for the extension wires such that their coefficients of conductivity will provide a thermal equalization within the acceptable range of wire gauges and thermoelectric characteristics.

Figure 4:
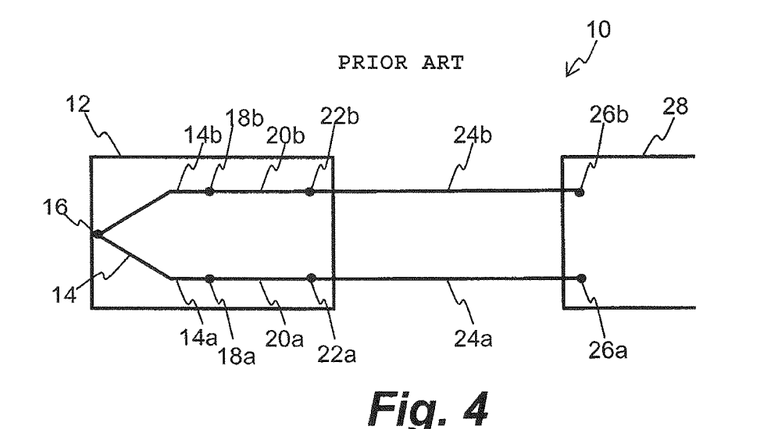
FIG. 4 is a diagram of a known temperature sensor.

Referring now to FIG. 4 there is an example of a known thermocouple system 10 comprising a sensor 12 including a noble metal thermocouple 14 having a measurement junction 16 and positive and negative thermocouple leads 14a, 14b, a measuring instrument 28, including reference junctions 26a, 26b and extension wires 24a, 24b connecting the sensor 12 to the measurement instrument 28. The sensor 12 also includes cold junctions 18a, 18b and connector junctions 22a, 22b. Connecting wires 20a, 20b connect the positive and negative thermocouple leads 14a, 14b to the connector junctions 22a, 22b. The extension wires 24a, 24b connect the connecting wires 20a, 20b to the reference junctions 26a, 26b.

In the known thermocouple system 10, of FIG. 4, the connecting wire 20a and the extension wire 24a connected to the positive lead 14a of the thermocouple 14 are made conventionally of copper (Cu) having a nominal heat conductivity coefficient of approximately 390 W/m-K at 68° F. The connecting wire 20b and extension wire 24b connected to the negative lead 14b of the thermocouple 14 are made of a copper-nickel alloy (CuNi) having nominal heat conductivity coefficient of 85 W/m-K at 68° F. More preferably, the negative extension wire consists nominally of 0.5% to 1.5% nickel, 0.25% to 0.40% manganese and balance copper. Since the material of 20b and 24b have ideally the same thermoelectric characteristics and the material of 20a and 24a have the same thermoelectric characteristics, this thermocouple system measures identically to one having a single conductor between junctions 18b and 26b and likewise, 18a and 26a. However, in the known system, as discussed above, the heat flow through the positive connecting/extension wires 20a, 24a toward the reference junction 26a is different from the heat flow through the negative connecting/extension wires 20b, 24b toward the reference junction 26b due to the inherent differences in thermal conductivity and radiation of the respective extension/connecting wires. The difference in heat flow may result in a measurement error due to a differential emf arising at the junctions 18a, 18b.

Figure 5A:
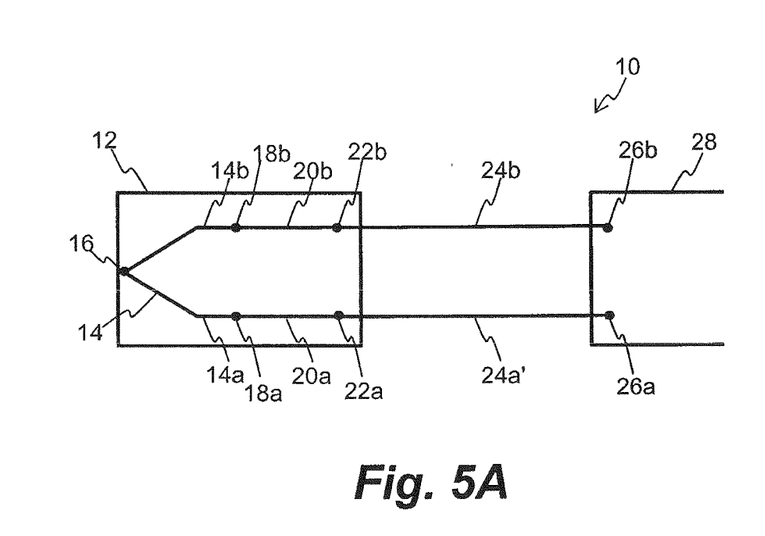
FIG. 5a is a diagram of the first embodiment of the present invention.

Referring now to FIG. 5a there is shown a first preferred embodiment of the invention having a positive extension wire segment 24a' different from 24a and which is identical to the known system of FIG. 4 in all other respects except as specifically described. In the first preferred embodiment, the preferred material for the extension wire 24a' is an alloy of copper and manganese (CuMn) having a nominal heat coefficient of 155 W/m-K at 68° F., which can vary between 100 and 250 W/m-K as the temperature ranges from 32° F. to 400° F., and more preferably between 145 and 190 W/m-K as the temperature ranges from 32° F. to 400° F. Preferably, the percentage of manganese in the extension wire 24a' is 1%±0.35%. More preferably, the composition of the extension wire 24a' is between 0.65 and 1.35 percent by weight manganese, with the balance being copper. In the first preferred embodiment, the thermal conductivity and/or the gauges of the extension wires 24a', 24b are purposely selected such that the heat flow from each of the cold junctions 18a, 18b in the direction of the measurement junctions 26a, 26b is governed such that the flow of heat from the junction 18a in the direction of the reference junction 26a and the flow of heat from the junction 18b in the direction of the reference junction 26b are such that a quantity of the respective heat flows differs by less than a predetermined amount and is preferably substantially equal in amount.

Figure 5B:
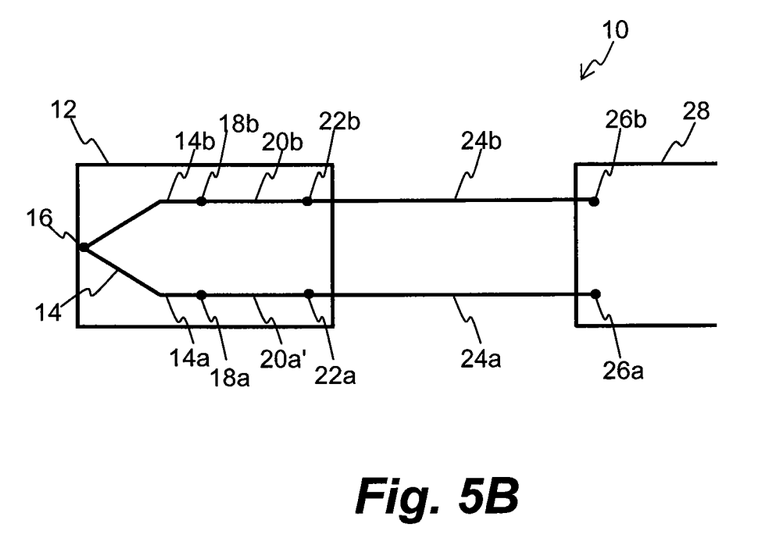
FIG. 5b is a diagram of the second embodiment of the present invention.

Referring to FIG. 5b there is shown a second preferred embodiment of the invention having a positive connecting wire 20a' different from 20a and which is identical to the known system of FIG. 4 in all other respects except as specifically described. In the second preferred embodiment, the utilization of a connecting wire 20a' of lower thermal conduction serves as a thermal break. In the second preferred embodiment, the preferred material for the connecting wire 20a' is an alloy of copper and manganese (CuMn) having a nominal heat coefficient of 155 W/m-K, which can vary between 100 and 250 W/m-K as the temperature ranges from 32° F. to 400° F., and more preferably between 140 and 190 W/m-K as the temperature ranges from 32° F. to 400° F. Preferably, the percentage of manganese in the connecting wire 20a' is 1%±0.35%. More preferably, the composition of the connecting wire 20a' is between 0.65 and 1.35 percent by weight manganese, with the balance being copper. In the second preferred embodiment, the thermal conductivity and/or the gauges of the connecting wires 20a', 2b are selected such that the heat flow conducted through the connecting wires 20a', 20b from each of the cold junctions 18a, 18b in the direction of the extension wires 24a, 24b is governed such that the heat flow is preferably but not necessarily substantially equal when the Cu/CuNi extension wires 24a, 24b are connected to the reference junctions 26a, 26b. Note that although the connecting wires 20a', 20b are shown within the sensor 12, they can be external to the sensor 12.

Figure 5C:
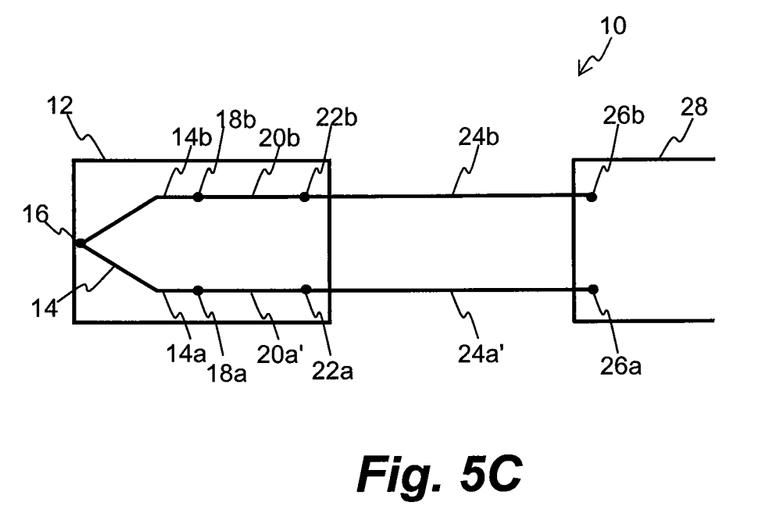
FIG. 5c is a diagram of the third embodiment of the present invention.

Referring to FIG. 5c there is shown a third preferred embodiment of the invention having a positive connecting wire 20a' and a positive extension wire 24a' and which is identical to the known system of FIG. 4 in all other respects except as specifically described. In the third preferred embodiment, the preferred material for the connecting wire 20a' and the extension wire 24a' is an alloy of copper and manganese having a nominal heat coefficient of 155 W/m-K, which can vary between 100 and 250 W/m-K as the temperature ranges from 32° F. to 400° F., and more preferably between 145 and 190 W/m-K as the temperature ranges from 32° F. to 400° F. Preferably, the percentage of manganese in the connecting wire 20a' and the extension wire 24a' is 1%±0.35%. More preferably, the composition of the connecting wire 20a' and the extension wire 24a' is between 0.65 and 1.35 percent by weight manganese, with the balance being copper. In the third preferred embodiment, identical metals are connected at the junctions between the connecting wires 20a', 20b and the respective extension wires 24a', 24b. The thermal conductivity and/or the gauges of the extension wires 20a', 20b and 24a', 24b are purposely selected such that the heat flow from each of the cold junctions 18a, 18b in the direction of the measurement junctions 26a, 26b is governed such that the flow of heat from the junction 18a in the direction of the reference junction 26a and the flow of heat from the junction 18b in the direction of the reference junction 26b are such that a quantity of the respective heat flows differs by less than a predetermined amount and is preferably substantially equal in amount. Because the heat flow may be controlled by adjusting the gauge of one or both of the connecting wire 20a', and the extension wire 24a', greater flexibility in selecting the gauges of the wires is achieved.

The present invention is not limited to thermocouple systems using noble metal thermocouples and a negative extension wire made of a CuNi alloy. The CuMn alloy used in the preferred embodiments is equally applicable to any thermocouple system in which the conventional positive extension wire is unalloyed copper. Such thermocouple systems include, but are not limited to, those systems which employ type B, K and T thermocouples as well as type R and S thermocouples. Further, the concept of equalizing the heat flow in the extension wires by selecting a composition of the extension wires is applicable to any type of thermocouple system, and is not limited to any particular choice of materials for use in the extension wires.

Ideally, the heat flow emanating from the cold junction to the measurement junction through the respective extension wires should be equal in order to completely eliminate the error source. However, one skilled in the art would understand that it is not necessary to completely equalize the heat flow in order to obtain a significant reduction in error, particularly where successive measurements are made with the same thermocouple sensor. Further, while the economic advantages of the invention are particularly applicable to disposable temperature sensors employing a noble metal sensor, the concept of equalizing the heat flow in the wires from an intermediate junction to the reference junction is equally applicable to any thermocouple system where the error due to unequal heat flow through the extension wires contributes error to the temperature measurement.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A thermocouple system comprising:
   a type R or a type S thermocouple having a positive lead and a negative lead;
   a negative wire electrically connected to the negative lead of the type R or type S thermocouple; and
   a positive wire consisting essentially of 0.65 to 1.35 percent manganese, balance copper, electrically connected to the positive lead of the type R or type S thermocouple.

2. The thermocouple system of claim 1, wherein the positive wire is directly connected to the positive lead of the thermocouple.

3. The thermocouple system of claim 1, wherein the thermocouple is included in a sensor having a connector and the positive wire is connected to the positive lead of the thermocouple via the connector.

4. A positive thermocouple connection/extension wire composition for use with a Platinum/Platinum-Rhodium thermocouple system, the thermocouple system comprising a thermocouple having positive and negative leads and a positive connection/extension wire connected to the positive lead,
wherein the positive lead of the thermocouple is a Platinum-Rhodium alloy selected from the group consisting of Platinum-10 percent Rhodium and Platinum-13 percent Rhodium, and
wherein the positive thermocouple connection/extension wire composition consists essentially of in percent by weight: Manganese 0.65 -1.35 and balance copper.

5. The positive thermocouple connection/extension wire composition of claim 4, wherein the composition has a thermal conductivity of between 145-190 W/m-K over the temperature range of 32° F.- 400° F.

6. The positive thermocouple connection/extension wire composition of claim 4, wherein the Platinum/Platinum-Rhodium thermocouple system further comprises a negative copper-nickel thermocouple connection/extension wire connected to the negative lead of the thermocouple.

7. A positive thermocouple connection/extension wire composition for use as a thermocouple positive connection/extension wire in a Platinum/Platinum-Rhodium thermocouple system, the thermocouple system comprising a thermocouple having positive and negative leads and a positive connection/extension wire connected to the positive lead.
wherein the positive lead of the thermocouple is a Platinum-Rhodium alloy selected from the group consisting of Platinum-10 percent Rhodium and Platinum-13 percent Rhodium, and
wherein the positive thermocouple connection/extension wire composition has a thermal conductivity of between 100-250 W/m-K over a temperature range of 32° F.- 400° F.

8. The positive thermocouple connection/extension wire composition of claim 7, wherein the composition is in percent by weight: Manganese 0.65-1.35 and balance copper.

9. The positive thermocouple connection/extension wire composition of claim 7, wherein the Platinum/Platinum-Rhodium thermocouple system further comprises a negative extension wire connected to the negative lead of the thermocouple, and
wherein the negative lead is platinum and the negative extension wire consists nominally of 0.5 percent to 1.5 percent nickel, 0.25 percent to 0.40 percent of manganese, and balance copper.

* * * * *